United States Patent [19]
Bright

[11] Patent Number: 4,952,462
[45] Date of Patent: Aug. 28, 1990

[54] DECORATIVE PANELS AND METHODS OF MAKING THE SAME

[76] Inventor: Elvin M. Bright, 17242 Bircher St., Granada Hills, Calif. 91344

[21] Appl. No.: 162,060

[22] Filed: Feb. 29, 1988

[51] Int. Cl.⁵ .............................................. A47B 35/00
[52] U.S. Cl. ................................ 428/542.2; 428/105; 428/114; 428/192; 428/212; 428/215; 428/213; 428/217; 428/323; 428/327; 428/415; 428/417; 428/425.6; 428/428; 428/441; 428/913.3; 428/410
[58] Field of Search .............. 428/413, 415, 441, 426, 428/537.1, 702, 913.3, 13, 14, 38, 142, 143, 161, 195, 203, 204, 206, 207, 213, 217, 324, 363, 402, 542.2, 417, 423.1, 423.3, 425.1, 410, 192, 105, 114, 212, 215, 323, 327, 425.6, 428, 430, 435, 442, 520

[56] References Cited
U.S. PATENT DOCUMENTS

| | | | |
|---|---|---|---|
| 3,666,614 | 5/1972 | Snedeker et al. | 428/442 |
| 4,126,730 | 11/1978 | Molari | 428/537.1 |
| 4,204,025 | 5/1980 | LeGrand et al. | 428/409 |
| 4,230,769 | 10/1980 | Goossens | 428/412 |
| 4,307,883 | 12/1981 | Kelly | 428/537.1 |
| 4,427,743 | 1/1984 | Katsuki et al. | 428/412 |
| 4,473,613 | 9/1984 | Jaisle et al. | 428/537.1 |
| 4,505,768 | 3/1985 | Cooley | 428/920 |
| 4,689,275 | 8/1987 | Sandman | 428/537.1 |
| 4,801,495 | 1/1989 | van der Hoeven | 428/542.8 |

FOREIGN PATENT DOCUMENTS 1142817 2/1969 United Kingdom ................ 428/412

Primary Examiner—Thurman K. Page
Assistant Examiner—Donald J. Loney
Attorney, Agent, or Firm—Merchant & Gould

[57] ABSTRACT

Impact resistant table tops and wall panels having adhered tempered glass surfaces comprise a thin resin substrate adhered to the slightly roughened underside of the glass by a transparent elastomeric interlayer of greater than 0.050" thickness. The resin substrate may itself comprise a decorative surface of variegated appearance, and may encapsulate a core body used for support and strength purposes.

11 Claims, 3 Drawing Sheets

DROP HEIGHT (FT.) 1-1/2 LB. STEEL BALL

INTERLAYER THICKNESS

DECORATIVE PANELS AND METHODS OF MAKING THE SAME

BACKGROUND OF THE INVENTION

Glass topped tables, in which a protective glass sheet is fitted but not attached or bonded to an underlying surface of a decorative or structural nature, are well known. The glass surface is added on top not only because it is transparent but because it is also weather resistant, abrasion resistant, hard, and easy to clean. The same advantages can be had with glass covered decorative wall panels if the glass is firmly secured. Whether secured or not, the dangers presented in the event of glass fracture are evident.

Safety glasses, in which a glass sheet is rendered shatter-proof or at least shatter-resistant, are also well known. Some safety glasses are made by tempering processes while others are made by laminating layers of glass sheet, or glass and plastic sheet, together with interposed transparent adhesives. While these techniques increase the cost of the glass, conventional plate and float glasses are not often able to withstand the heavy loads and high shocks to which tables for commercial use are subjected. In some restaurants, for example, the practice is to stack tables while cleaning, and this is done in vigorous and abrupt fashion, without any particular regard for fragility.

Thus although there is substantial demand for glass surfaced decorative table and panel surfaces, economic and safety factors have hitherto limited their use. If such problems could be resolved, the visually attractive features of a glass surface could be attained along with the easy maintenance and freedom from wear under typical levels of use. In addition, it is usually inconvenient or impractical to transport, mount or secure glass covers for decorative flat table tops or wall panels, and it is preferable for aesthetic reasons to have a unitary structure without the appearance of attachment.

The standard test for measuring the impact resistance of glass sheet products involves dropping a steel ball of selected standard weight (1½ lbs.) from increasingly greater heights until the glass cracks. The glass should withstand a drop of at least 4' to pass the test. Where a glass surface is adhered to an underlying substrate the impact resistance increases somewhat, but the improved impact resistance is not generally sufficient in prior art structures to protect against normal accidents, such as dropping a glass container filled with liquid on the table top. In addition, the physical properties of such products usually vary too much when they are manufactured in production quantities. There are a number of different causes, such as too much variation in adjacent layers, consequent presence of gaps, or variations between layers, making the product more subject to fracturing. In addition, differential shrinkage between substrate and glass layers can cause delamination, particularly near the edges. Even where good adhesion is initially obtained, delamination may take place after a period of use. It must be noted in addition that the adhesives must be transparent materials that adhere to glass without introducing an inordinate cost factor. For mechanical and strength reasons, and because adhesives heretofore known are expensive they cannot be used in substantial thicknesses.

SUMMARY OF THE INVENTION

In accordance with the invention, ornamental, high shock resistant, surfaces and panels having a decorative substrate and a glass surface are formed sequentially by drying a thin interlayer of transparent elastomeric adhesive on the glass, and then applying a relatively thin and fully conforming layer of a volumetrically shrinkable resin onto the substantially dried adhesive, the resin having some elastomeric properties. Multicolor layers or patterns may be formed integrally in the resin itself, as by utilizing multicolor stone powders as fillers, or decorative sheet materials may be embedded in the material. The structure, if to be used as a table top, can be augmented by a low density board or panel that is embedded in the resin and provides a unitary low cost filler member. The resultant body, which has a visible decorative surface formed or embedded in the resin, absorbs impacts on the glass by omnidirectional distribution of impact forces throughout the composite substrate structure. The resin conforms to the glass and together with the elastomeric adhesive interlayer distributes shocks evenly and widely. This composite structure enables a relatively thin tempered glass layer to withstand the impact of a 1½ lb. steel ball dropped from more than 4 feet.

In a more particular example, a decorative panel, such as a table top, is formed by spreading a viscous layer of elastomeric transparent adhesive of approximately 0.050" to 0.080" thickness on a cleaned and slightly roughened or abraded tempered glass of ¼" thickness to which a thin primer layer has been applied. The adhesive is dried with local heating to remove bubbles and give a non-tacky, dry uniform interlayer. A mix of colored catalyzed resin having a volumetric shrinkage characteristic including about 55% by weight of colored mineral frit is then layered onto the adhesive to a depth of about 3/16" within an encircling border. The frit may be mixed into and convoluted within the resin in spatial patterns to give a variegated appearance such as carnelian, marble or malachite. The filled resin mix is made bubble free after application and before curing by local heating as with a moving torch. A low cost filler panel comprising particle or plywood board of approximate ¾" thickness is placed on the resin layer before full curing, and covered by a thin further layer of catalyzed resin that unites around the edges of the panel with the previous resin layer so that the low density structural filler panel becomes totally encapsulated. Where the decorative panel is to be used as a table top, a structural base is secured to a filler panel on the opposite side from the glass.

The outer border may be left in place for certain designs, or removed to expose the edge of the unit after curing of the resin. The edge surfaces may then be contoured and polished. A high finish effect may be obtained by using a particulate matching the hardness of the resin.

In another specific example in accordance with the invention, the visible ornamental surface is a thin pattern of fabric, film, veneer or the like, embedded within the adhesive interlayer. After air bubbles are eliminated from the interlayer, the chosen decorative sheet is applied and covered on the opposite side by further resin to which the lower cost, low density backing board is attached. This structure is typically molded within a wood or other border that is to serve as a permanent frame for the surface.

In accordance with another feature of the invention, unique translucent properties are provided by utilizing a powder filler having an index of refraction substantially different from that of the clear resin but still uncolored, such that internal reflections within the particulate impart the appearance of rock crystal to the unit.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 2:
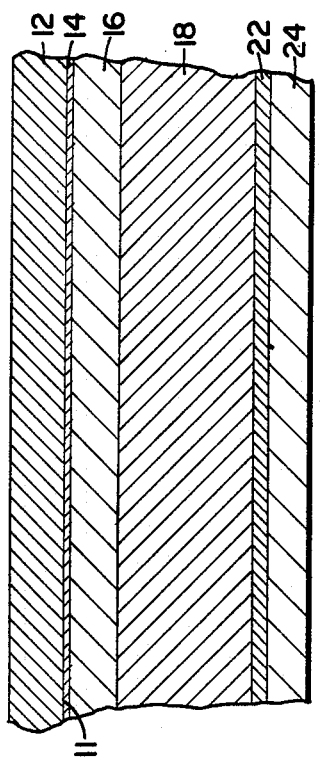
FIG. 2 is a side sectional view of a portion of the structure of FIG. 1, shown in enlarged form.
Figure 1:
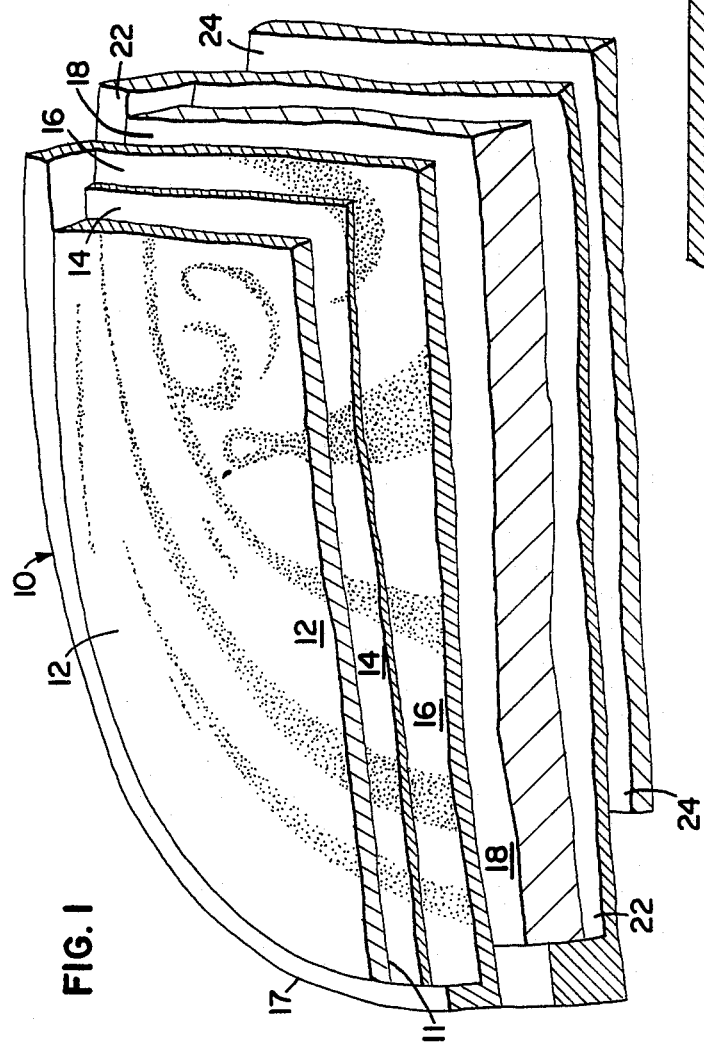
FIG. 1 is a fragmentary perspective view, partially broken away, of a glass covered decorative panel in accordance with the invention.

Referring now to FIGS. 1 and 2, which are not to scale, a finished product in accordance with the invention comprises a panel in the form of a table top 10, only a portion of which is shown in the fragmentary view of FIG. 1. This decorative panel structure 10 comprises a ¼"-tempered glass top 12 coated with a thin primer layer 11 of minimal thickness and overlying a 0.050" to 0.080" elastomeric adhesive interlayer 14. A target thickness of 0.070" is generally aimed for, but with very large pieces (i.e. greater than 6'–8' long) the target thickness is increased. The interlayer 14 in turn overlies a conforming decorative, frit filled resin substrate 16 of approximately 3/16" thickness. The substrate 16 merges into the upper part of a peripheral side wall 17 fitting about the glass 12. A particle board 18 of ¾" thickness is encapsulated between the conforming resin layer 16 on its upper side, the side wall 17, and a frit filled underlayer 22 forming the principal underside portion of the panel structure 10. The underlayer 22 extends about the periphery of the board 18 to form the lower part of the side wall 17 and also fully encapsulate the board 18. A wood or metal base 24 is attached to the particle board 18 through the underlying layer 22 for purposes of attaching a center post, side legs or other support structure (not shown in FIGS. 1 and 2).

Although the tempered glass sheet is quite thin, it is uniform and flat surfaced, so that it has only small dimensional variations and is relatively free from waviness and internal imperfections. Experience has shown that tempered glass is necessary for the great majority of commercial applications, but ordinary plate or float glass can be employed where the use requirements are much less demanding. The complete elastomeric interlayer 14 structure preferably comprises a thin primer layer 11 of epoxy in direct contact with a very lightly sandblasted (roughened) surface on the glass 12. Minor pitting or indentations do not affect transparency but provide better sites for adhesion. A very light sandblasting is used for most applications, but a dilute acid solution (e.g. 5% muriatic acid) also functions well for this purpose.

The conforming resin layer 16 in this example serves as a matrix for a major amount of particle matter in the form of a dyed or naturally colored mineral frit, here 55% by weight of the total. The resin matrix itself is preferably a volumetrically shrinkable epoxy having an elastomeric characteristic, 40 to 90 Barcol hardness, and dyed to a selected color contrasting with the frit. Before the deposition of the resin layer 16 and the upper portion of the side wall 17, different colors of mixed resin and frit are poured into a container, then mixed and poured over the interlayer 14 to give not only dominant color effects but a variegated appearance, very like natural stone materials of semiprecious nature, such as carnelian, marble and malachite. A polyurethane resin matrix may also be employed because like volumetric shrinkage properties can be obtained.

Figure 5:
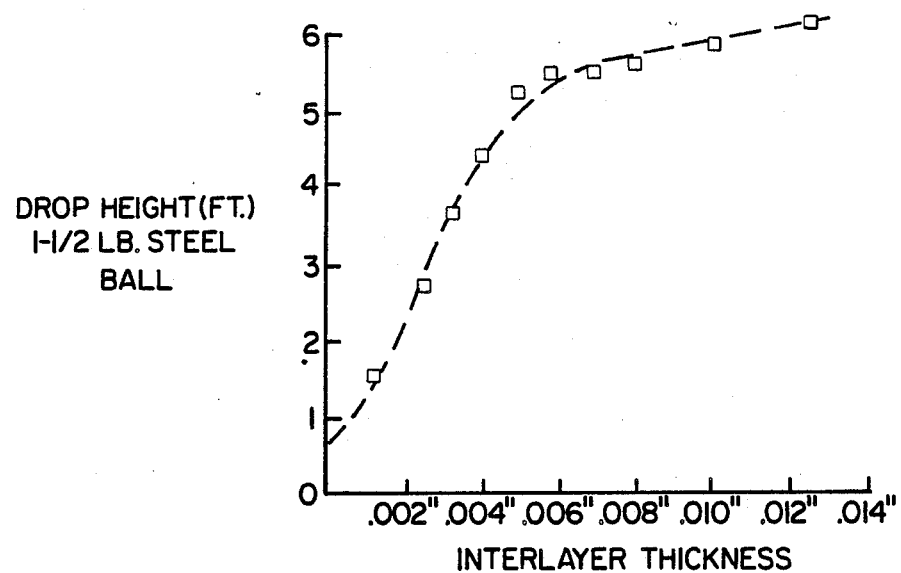
FIG. 5 is a graph showing the variation in the impact resistance of different products in accordance with the invention, in response to the steel ball test.

Wall panels, decorative table tops and other structures have been made utilizing the principles of the invention, and give surprising results in the ball impact test, as evidenced by FIG. 5. The impact resistance is sufficient to withstand greater than a 4' drop in all instances when a sufficient interlayer thickness has been provided. The volumetrically shrinkable material, although poured in a viscous form, conforms to the surface contours of the glass. The adhesive interlayer 14 is more compliant than the resin layer 16 but is closely confined by the substrate. Therefore it evenly distributes shock forces to the resin layer 16, there being no gaps between any of the layers of the laminate. The resin layer 16 also retains its shape and its conformity to the glass 12 after curing, which is not feasible with other resin matrices. Despite the thinness of the elastomeric interlayer 14 and the glass sheet 12, and despite the fact that the conforming resin layer 16, filled with more that 50% frit, is itself not very thick, the impact resistance is high in all instances. Panels have been made of 4'×8' size, retaining the same impact resistance throughout.

Adhesion between the substrate and the glass overlayer is a prime consideration, to avoid delamination and consequent lowering of impact resistance. The shear forces exerted because of differential shrinkage of the resin substrate relative to the glass are substantial. At the same time the interlayer must provide the needed distribution of impact forces to the substrate. It has been found that as described below, the surfaces must be specially prepared and very clean in order to insure adhesion under these circumstances. This is of greatest importance with long units because of the proportionately higher differential shrinkage introduced.

Although other filler materials may be utilized to provide the semiprecious stone effect, there are several advantages to employing a matching particulate such as alabaster. The alabaster and resin matrix have comparable hardnesses of about 46 on the Barcol scale to enable the side wall 17 to be polished so as to provide an effect matching the brilliance and attractiveness of the glass covered surface. Also, an alabaster frit when ground to a desired fineness (200 mesh) tend to assume a symmetrical, generally octagonal shape. Furthermore, alabaster is substantially less expensive than quartz and other powders and when dyed exhibits superior optical properties. Alabaster may also be used in undyed form to create its own color effects inasmuch as it has a soft, off-white characteristic.

Where the multi-layer structure is to be employed as a wall panel no core layer is used, since the wall itself serves as a physical backing. In this event the glass, interlayer and resin matrix define a laminate that typically is no greater than about ⅞" maximum in thickness.

Figure 3:
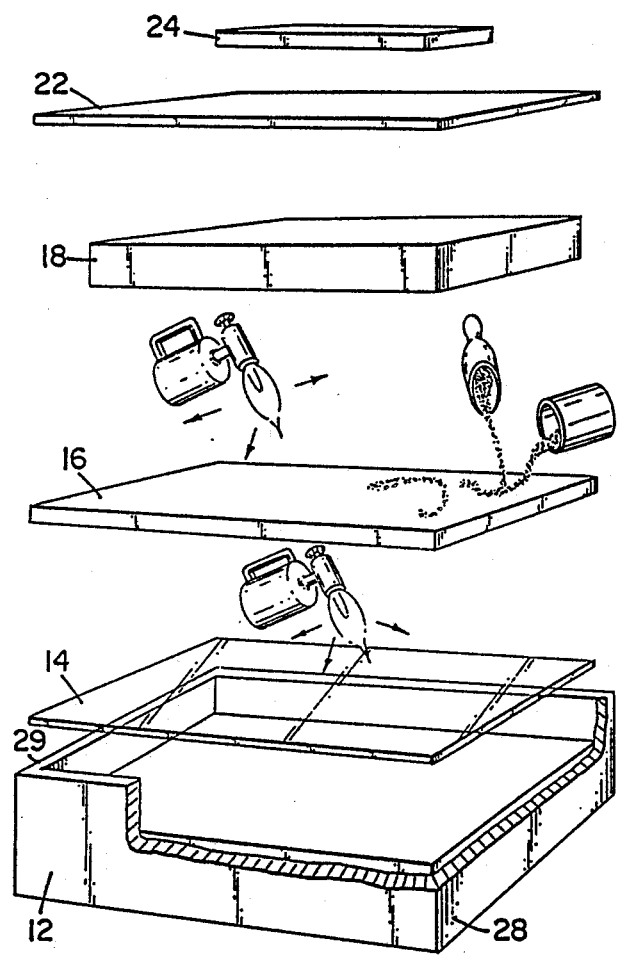
FIG. 3 is a combined block diagram and simplified diagrammatic representation of the steps of a method in accordance with the invention.

The successive steps of methods in accordance with the invention are depicted in FIG. 3, as applied to fabrication of the product of FIGS. 1 and 2. Various possible deviations and alternatives are discussed both in the course of these examples and subsequently. The sequence is based upon application of materials to the glass 12 in inverted position, until completion of the product when it is placed upright. The method steps of FIG. 3 are thus described in sequence starting at the immediate underside of the glass 12 and proceeding toward what will become the base.

The glass sheet 12 may be placed on a table 28 within a conforming dam or border 29 which defines the outer periphery of the panel 10 to be formed. The border 29 may match the outer periphery of the glass, whether circular, oval, rectangular or some other shape, and be attached to the final product. The border 29 may also be oversize relative to the glass 12, and removable so that it forms a mold for a cast margin for the panel 10, or provides a margin that is flush with the edge of the glass 12. The glass 12 is preferably supported on a flat surfaced table 28 to avoid bending during the application of subsequent materials, and the table is carefully leveled so that the glass 12 is horizontal. The margins of the conforming border 29, or a temporary dam structure, are made sufficiently high to enable the complete structure, approximately 1" in thickness, to be formed within it. Where a removable peripheral dam is to be used and the panel is to have an edge flush with the glass 12, wax is first applied around the outside edge of the glass sheet 12. The glass sheet 12 is thoroughly cleaned, first with polishing rouge which is vigorously applied by hand or machine. The rouge is washed off and the surface is thoroughly rinsed before being dried with absorbent material and a heat gun. A slightly roughened glass surface is then created by light sandblasting, which is preferred, or by applying a solution of 5% muriatic acid in distilled water. Thereafter the under surface of the glass sheet 12 is again washed with water, and dried off with absorbent material and a heat gun. The resultant minute shallow indentations or pitting in the glass surface improve adhesion without introducing haziness or a cloudy effect in the glass.

A thin but complete layer of epoxy primer 11 is then spread over the glass sheet 12, using a spray gun, flow coating, or a brush. This can be followed substantially immediately by a clear interlayer 14 mix of equal parts of epoxy resin (type #37-127 of Reichhold Chemicals) and catalyst (type #37-667 of Reichhold Chemicals).

The interlayer 14 comprises a transparent elastomeric adhesive and is applied over the primer 11 to a depth of 0.050" to 0.060", by spreading with a brush after thorough mixing. The preferred thickness for conventional table sizes is about 0.070", the range chosen being 0.060" to 0.080". Greater depths of interlayer increase the expense and are generally unnecessary, the benefits in impact distribution obtained by this variation being limited. The interlayer 14 may alternatively be applied by a squeegee having a lateral surface of spaced apart ridges including elongated grooves of the desired depth. The interlayer is then dried over a period of time, typically in excess of 3 hours, to a firm gel in which the interlayer reaches a non-tacky state. During the initial stages of drying, a heat gun is scanned over the surface to dissipate air bubbles, this procedure being repeated a number of times at about ten minute intervals to achieve an unbroken finish.

A substrate layer 16 of variegated stone appearance is then laid down using the conforming, frit filled epoxy, resin to a depth of ⅛" to 3/16" using chosen colors and spatial distributions in the manner described to get the effect of a panel of semiprecious material. The epoxy resin cures with volumetric shrinkage, reaching a gel state some minutes after application. As depicted in the succeeding step in FIG. 3, however, the resin 16 layer is also locally heated as by a heat gun one or more times while still somewhat liquid to remove all air bubbles, assuring the unbroken finish desired for the stone surface effect. Before the resin 16 layer changes from a soft gel to a hard solid, the ¾" particle board 18 is applied, using a thin layer of the epoxy-frit mixture as the bonding agent. An adequate amount of the resin 16 is used so that the resin extrudes and covers the sides of the generally conforming particle board 18 when it is pressed down. Thus the resin fills the space between the edge of the particle board 18 and the conforming dam or border 29, and continues the decorative pattern of the surface. A different pattern, such as a single color surface, can alternatively be inserted along the sides, but the same surface pattern is generally desired. The underlayer 22 is then applied over the particle board 18, and this can be one solid color or a continuation of the variegated pattern. Again the heat gun is applied at intervals to remove bubbles. When the underlayer 22 has set somewhat a structural base may be affixed by screws or other means penetrating into the particle board 18. The outer border 29, if to be removed, is separated from the fixtures in approximately 12 hours or when a Barcol hardness of about (thirty) 30 is reached. The edges of the structure may then be polished to a high finish. By using a frit matching the resin in hardness the mirror-like visible surface under the glass can be duplicated in appearance by polishing the edge. The table top or panel should not be subjected to stress loads for more than 48 hours after pouring. However, the hardness continues to increase, to at least a minimum of 40 on the Barcol scale, although it may go as high as 90. When the structure is turned over to its intended upright position the glass surface is uppermost but the resin substrate dominates the visual effect.

A different aesthetic effect can be provided by employing a translucent powder, such as mica, in undyed form. A clear resin is used and its index of refraction can be modified by additives if needed to substantially differ from the index of refraction of the filler. A substantial amount of the filler (e.g. more than 50%) imparts a rock crystal or frosted effect to the glass-surfaced product, due to internal reflections in the particulate.

Figure 4:
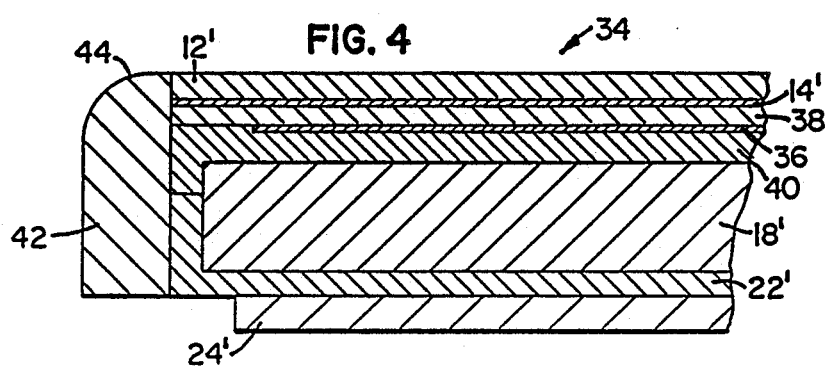
FIG. 4 is a side sectional view of a different system in accordance with the invention in which a decorative surface is inserted.

Another example of a structure in accordance with the invention is shown in FIG. 4. The table top structure 34 has the same impact resistant properties as the example of FIGS. 1 and 2, but a different surface appearance as determined by an embedded decorative sheet 36, here a photographic enlargement. Other attractive sheet materials, such as fabrics, wood, veneer or dried flower, can be used in like manner. A thin (e.g. 1/64") resin layer 38 is applied over the adhesive interlayer 14' on the glass 12', during processing. While the resin layer 38 is still wet, or at least viscous, the decorative sheet 36 is applied and worked into the resin so that the visible layers are free of bubbles, wrinkles and other imperfections. In this procedure a mirror can be placed under the float glass surface 12' and a squeegee used to iron the sheet material until the appearance is as desired. Such steps are particularly necessary with porous or irregularly surfaced materials such as open weave fabrics.

In the decorative table top 34 of FIG. 4, the substrate for the decorative sheet 36 is again a frit filled resin layer 40 into which a particle board 18' is set as previously described. The inferior portion again comprises an underlayer 22' and a base 24' as previously described. However, the outer periphery is a wood or other frame 42 having a peripheral lip 44, the top of which is flush with the float glass 12'. The outer frame 42 is firmly adhered to the resin layers when they set.

Figure 6:
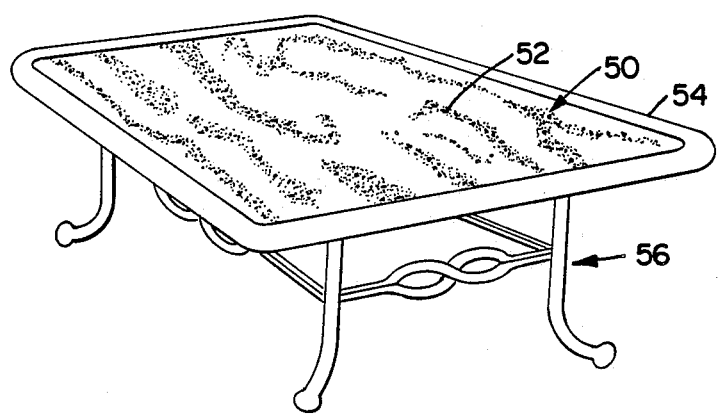
FIG. 6 is a perspective view of an illustrative table having a top in accordance with the invention.

A table top 50 in accordance with the invention is shown in simplified form in FIG. 6, to which reference is now made. Usually, the thin glass surface is not apparent and the user sees only the smooth ornamental surface 52 within, in this instance, a wood or metal border 54. The table top 50 has substantially uniform high impact resistance throughout what can be a large area, e.g. 3'×6' or more. The decorative stone appearance is effectively permanent, and the colors can be selected to match any desired decor. The supporting structure 56 can be of any chosen style and is readily attachable to the body of the table top 50.

Although a number of forms and variations have been described it will be appreciated that the invention is not limited thereto but encompasses all modifications and expedients within the scope of the appended claims.

What is claimed is:

1. A decorative panel having the capability of withstanding the impact of 1½ pound steel ball dropped from 4' or greater, comprising:
   (a) a glass upper layer having a flat undersurface;
   (b) a non-deformable transparent interlayer of about 0.050" or greater in thickness disposed on the undersurface, the interlayer having an elastomeric characteristic and adhesive properties;
   (c) a substrate of in excess of about ¼" thickness of resin, the resin having a first hardness rating, the resin having a volumetric shrinkage characteristic and an elastomeric property and attached to the interlayer on the opposite side from the glass layer, wherein the interlayer is more compliant than the resin and distributes shock waves thereto from impacts on the glass, wherein the glass, interlayer and substrate are firmly united with no spaces or voids between them, wherein the glass layer is tempered glass, and wherein the substrate is of epoxy resin; and
   (d) decorative effect means, the decorative effect means comprising in excess of 50% of dyed mineral frit in a decorative pattern within the substrate, the dyed mineral frit having a second hardness rating, wherein the first hardness rating and the second hardness rating are substantially identical, thereby permitting polishing of substrate edge surfaces to a mirror like finish.

2. The invention as set forth in claim 1 above, wherein the panel further comprises a lower density board backing adhered to the resin substrate, wherein the substrate has a Barcol hardness in the range of 40 to 90, and wherein the interlayer is of about 0.050" to 0.080" in thickness.

3. The invention as set forth in claim 2 above, wherein the mineral frit comprises alabaster of about 200 mesh substantially matching the resin substrate in hardness.

4. The invention as set forth in claim 2 above, wherein the board backing is approximately ¾" in thickness and further including a resin layer covering the underside of the board backing.

5. The invention as set forth in claim 2 above, wherein the decorative effect means comprises a decorative sheet embedded within the substrate.

6. The invention as set forth in claim 2 above, wherein the decorative effect means comprises a translucent powder filler within the substrate, the index of refraction of the powder filler substantially differing from the index of refraction of the substrate.

7. The invention as set forth in claim 5 above, wherein the substrate comprises a resin layer of approximately 1/64" thickness below the interlayer, an embedded decorative sheet adhering to the resin layer and a further resin layer embedding the decorative sheet.

8. A decorative glass covered planar structural unit comprising:
   (a) a tempered glass top surface member having a slightly roughened surface;
   (b) a primer layer, the primer layer having a first side and a second side, the first side being disposed on the top surface of the glass surface in adherent relation thereto;
   (c) an interlayer of cured flexible resin about 0.050" to 0.080" thick, the cured flexible resin having a first side and a second side, the first side of the resin being adhered to the second side of the primer layer disposed on the glass member;
   (d) a cured substrate layer, the substrate layer having a first side and a second side, the substrate layer including a resin and in excess of 50% mineral frit, the first side of the substrate layer being adhered to the second side of the interlayer, the substrate layer having a thickness greater than about 3/16", the resin having a first hardness rating, the mineral frit having a second hardness rating, wherein the first hardness rating and the second hardness rating are substantially identical, thereby permitting polishing of substrate edge surfaces to a mirror like finish; and
   (e) a planar core attached to the second side of the substrate layer.

9. The invention as set forth in claim 8 above, further including a bottom layer of frit-containing cured resin embedding the planar core and having a thickness of greater than about 3/16", and wherein the primer and interlayer are of transparent material.

10. The invention as set forth in claim 9 above, wherein the primer layer comprises an epoxy and wherein the cured base resin layer comprises at least two colors in a variegated arrangement.

11. The invention as set forth in claim 10 above, wherein the planar core is particle board.

* * * * *